(12) United States Patent
Baek et al.

(10) Patent No.: US 10,733,709 B2
(45) Date of Patent: Aug. 4, 2020

(54) IMAGE PROCESSING DEVICE AND IMAGE PROCESSING METHOD

(71) Applicant: SAMSUNG ELECTRONICS CO., LTD., Suwon-si (KR)

(72) Inventors: Seung-jin Baek, Suwon-si (KR); Seung-ran Park, Hwaseong-si (KR); Ho-sik Sohn, Seoul (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/317,401

(22) PCT Filed: Mar. 7, 2017

(86) PCT No.: PCT/KR2017/002474
§ 371 (c)(1),
(2) Date: Jan. 11, 2019

(87) PCT Pub. No.: WO2018/012704
PCT Pub. Date: Jan. 18, 2018

(65) Prior Publication Data
US 2019/0251671 A1  Aug. 15, 2019

(30) Foreign Application Priority Data

Jul. 11, 2016 (KR) .................. 10-2016-0087433

(51) Int. Cl.
*G06T 5/00* (2006.01)
*G06T 7/13* (2017.01)
(Continued)

(52) U.S. Cl.
CPC ............... *G06T 5/003* (2013.01); *G06T 5/00* (2013.01); *G06T 5/20* (2013.01); *G06T 7/11* (2017.01);
(Continued)

(58) Field of Classification Search
USPC ....................................................... 345/589
See application file for complete search history.

(56) References Cited

U.S. PATENT DOCUMENTS

| 7,248,268 B2 | 7/2007 | Brown Elliot et al. |
| 7,443,463 B2 | 10/2008 | Chang et al. |

(Continued)

FOREIGN PATENT DOCUMENTS

| JP | 4085635 B2 | 5/2008 |
| KR | 10-2007-0098263 A | 10/2007 |

(Continued)

OTHER PUBLICATIONS

Written Opinion (PCT/ISA/237) issued by the International Searching Authority in corresponding International Application No. PCT/KR2017/002474, dated Jun. 16, 2017.

(Continued)

*Primary Examiner* — Shivang I Patel
(74) *Attorney, Agent, or Firm* — Sughrue Mion, PLLC (57) ABSTRACT

Provided are an image processing device and an image processing method. The image processing device comprises: a display; and a processor for determining an edge area within an input image and a peripheral area of the edge area, and determining a pixel value of the edge area on the basis of pixel characteristics of a plurality of pixels included in the peripheral area, thereby providing an image, in which the edge area is compensated on the basis of the determined pixel value, to the display.

14 Claims, 8 Drawing Sheets

(51) Int. Cl.
*G06T 7/11* (2017.01)
*G06T 5/20* (2006.01)
(52) U.S. Cl.
CPC ...... *G06T 7/13* (2017.01); *G06T 2207/20192* (2013.01)

(56) References Cited

U.S. PATENT DOCUMENTS

| | | | |
|---|---|---|---|
| 7,907,112 | B2 | 3/2011 | Chang et al. |
| 7,983,506 | B2 | 7/2011 | Choe et al. |
| 8,451,288 | B2 | 5/2013 | Kondo et al. |
| 8,970,916 | B2 | 3/2015 | Nakamura |
| 9,569,990 | B2 | 2/2017 | Ha |
| 2008/0056604 | A1* | 3/2008 | Choe ............... G09G 3/2003 382/269 |
| 2013/0271798 | A1 | 10/2013 | Nakamura |
| 2014/0240375 | A1 | 8/2014 | Ha |
| 2014/0320438 | A1 | 10/2014 | Yurlov et al. |

FOREIGN PATENT DOCUMENTS

| | | |
|---|---|---|
| KR | 10-0818988 B1 | 4/2008 |
| KR | 10-1006050 B1 | 1/2011 |
| KR | 10-1030537 B1 | 4/2011 |
| KR | 10-1265102 B1 | 5/2013 |
| KR | 10-2013-0126679 A | 11/2013 |
| KR | 10-2014-0129806 A | 11/2014 |
| WO | 2015-190640 A1 | 12/2015 |

OTHER PUBLICATIONS

International Search Report (PCT/ISA/210), issued by International Searching Authority in corresponding International Application No. PCT/KR2017/002474, dated Jun. 16, 2017.

\* cited by examiner

IMAGE PROCESSING DEVICE AND IMAGE PROCESSING METHOD

TECHNICAL FIELD

The disclosure relates to a display device and an image processing method thereof. More particularly, the disclosure relates to an image processing method which is capable of enhancing an image quality using a pixel characteristic of a display, and a display device.

DESCRIPTION OF RELATED ART

In related art, when an image quality processing of a display is performed, the image quality processing is performed using only an image signal in which a pixel characteristic of the display is not reflected. In addition, in related art, there is an image processing method which performs a subpixel rendering by preserving a pixel value based on a fine pitch in a special pixel structure such as RGBW rather than the existing RGB pixel.

However, the related-art image processing method does not reflect a pixel characteristic of a light-emitting diode (LED) display. In the LED display, pixels may be a form of a package or a chip in which the respective pixels emit light independently of each other, unlike a liquid crystal display (LCD). When the image quality processing method in which a pixel characteristic of a normal LCD display is reflected is applied to the LED display, there is a problem that an image quality visible from an actual LED display is deteriorated due to a difference between a characteristic of an LED pixel structure and a characteristic of the LCD display. Accordingly, an image quality processing method in which a pixel characteristic of an LED display is demanded.

DETAILED DESCRIPTION

Technical Problem

Aspects of the disclosure are to address at least the above-mentioned problems and/or disadvantages and to provide at least the advantages described below. Accordingly, an aspect of the disclosure is to provide an image processing method for compensating an edge area generated according to a display pixel structure by means of a pixel characteristic of at least one of a pixel pitch and amount of luminescence of an edge surrounding area and thereby, enhancing an image quality of an edge area.

Solution to Problem

In accordance with an aspect of an example embodiment, a display device is provided. The display device includes a display, and a processor for determining an edge area within an input image and a peripheral area of the edge area, and determining a compensation value of the edge area on the basis of at least one characteristic from among a pixel pitch between a plurality of pixels included in the peripheral area and an amount of luminescence of the plurality of pixels, thereby providing an image, in which the edge area is compensated on the basis of the determined pixel value, to the display.

The processor may detect a gradient on the basis of a contrast among a plurality of pixels included in the input image, and determine an edge area on the basis of a size of the gradient.

The processor may determine an area including a gradient of which the size of the gradient is greater than a predefined value as an edge center area, and maintain a pixel value of the determined edge center area at an original brightness of a pixel.

The processor may determine an area excluding the edge center area from among the edge area as an edge outskirt area, and lighten a brightness of pixels of the edge outskirt area by adjusting an amount of luminescence of the plurality of pixels included in the peripheral area.

The processor may compensate a pixel value of the edge area by using a function $l'(x)=l(x)+f(g, d, L)$ on the basis of the pixel pitch, the amount of luminescence, and the gradient, where the $l'(x)$ represents an input pixel value of the edge area, the $f(g, d, L)$ represents a function for lightening a brightness of the edge area, the g represents a value of the gradient, the d represents a pixel pitch between a plurality of pixels included in the peripheral area, and the L represents an amount of luminescence of pixels included in the peripheral area.

The pixel pitch may be a distance between pixels of the edge peripheral area facing based on the edge area.

The display comprises a light-emitting diode (LED).

In accordance with an aspect of the disclosure, an image processing method is provided. The image processing method includes determining an edge area within an input image and a peripheral area of the edge area, determining at least one characteristic from among a pixel pitch and amount of luminescence of a plurality of pixels included in the peripheral area, compensating a pixel value of the edge area on the basis of the determined pixel characteristic, and rendering a compensated image of the edge area to the display.

The determining the edge area within the input image and the peripheral area of the edge area may include detecting a gradient on the basis of a contrast among a plurality of pixels included in the input image.

The compensating may include determining an area including a gradient of which the size of the gradient is greater than a predefined value as an edge center area, and maintaining a pixel value of the determined edge center area at an original brightness of a pixel.

The compensating may include determining an area excluding the edge center area from among the edge area as an edge outskirt area, and lightening a brightness of pixels of the edge outskirt area by adjusting an amount of luminescence of the plurality of pixels included in the peripheral area.

The compensating may include compensating a pixel value of the edge area by using a function $l'(x)=l(x)+f(g, d, L)$ on the basis of the pixel pitch, the amount of luminescence, and the gradient, where the $l'(x)$ represents an input pixel value of the edge area, the $f(g, d, L)$ represents a function for lightening a brightness of the edge area, the g represents a value of the gradient, the d represents a pixel pitch between a plurality of pixels included in the peripheral area, and the L represents an amount of luminescence of pixels included in the peripheral area.

Effect of the Invention

On the basis of the above-mentioned example embodiments, it is possible to improve expressibility of an image quality by reducing deterioration occurring in an edge area of an image by means of a structure of pixels included in the display and a luminescence amount characteristic.

PREFERRED EMBODIMENTS FOR CARRYING OUT THE INVENTION

Hereinafter, the terms used in exemplary embodiments will be briefly explained, and exemplary embodiments will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. In addition, in a special case, terms selected by the applicant may be used. In this case, the meaning of the terms will be explained in detail in the corresponding detailed descriptions. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be realized as at least one processor except for 'modules' or 'units' that should be realized in a specific hardware.

Further, in the present disclosure, a case in which any one part is connected with the other part includes a case in which the parts are directly connected with each other and a case in which the parts are electrically connected with each other with other elements interposed therebetween. Further, when a certain portion is stated as "comprising" a certain element, unless otherwise stated, this means that the certain portion may include another element, rather than foreclosing the same.

The above and other aspects of the present disclosure will become more apparent by describing in detail exemplary embodiments thereof with reference to the accompanying drawings. However, exemplary embodiments may be realized in a variety of different configurations, and not limited to descriptions provided herein. Further, those that are irrelevant with the description are omitted so as to describe exemplary embodiments more clearly, and similar drawing reference numerals are used for the similar elements throughout the description.

Figure 1:
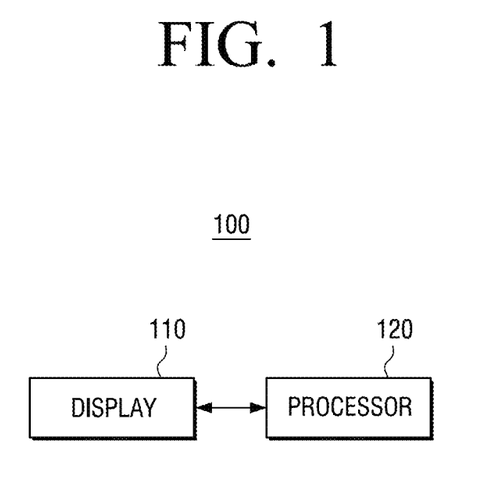
FIG. 1 is a block diagram illustrating a simple configuration of a display device, according to an example embodiment.

FIG. 1 is a block diagram illustrating a simple configuration of a display device, according to an example embodiment.

As illustrated in FIG. 1, the display device 100 may include a display 110 and a processor 120.

The display 110 may display an image input to (or received in) the display device 100. When an image signal input to the display device 100 is analyzed using a method such as an edge analysis algorithm, an edge component may be detected in the display 110 by a structural characteristic of pixels included in the display 110. For example, the display 110 may be, as non-limiting examples, an LCD, LED, OLED, and the like.

The processor 120 may distinguish between an edge area and an edge surrounding area inside an input image on the basis of an input image signal input to the display device 100. For example, the processor 120 may divide the image into the edge area and the edge surrounding area by way of an edge analysis algorithm.

The processor 120 may identify at least one of a pixel pitch and an amount of luminescence among a plurality of pixels included in the edge surrounding area.

The processor 120 may identify a compensation value of the edge area on the basis of at least one of a pixel pitch and an amount of luminescence of the edge surrounding area. The pixel pitch of the edge surrounding area may refer to a distance between pixels of the edge surrounding area facing each other based on a center line of the edge area. For example, the processor 120 may be implemented such that an amount of luminescence of pixels included in the edge surrounding area increases as the pixel pitch of the edge surrounding area is increased (coarse pitch). Accordingly, the compensation value of the edge area may increase as an amount of luminescence of pixels included in the edge surrounding area is increased. That is, a brightness of the edge area which is close to the edge surrounding area may be increased and a scope of a black section of the edge area may be reduced.

The processor 120 may provide, to the display 110, an image for which the brightness of the edge area has been compensated based on the compensation value of the edge area.

The processor 120 may detect a gradient on the basis of contrast among a plurality of pixels included in the input image, and identify an edge area inside the input image signal on the basis of a gradient size.

For image processing, the gradient may be used to find an edge of the image and a direction of the edge. For example, when it is assumed that an image brightness function f(x,y) represents a brightness of pixels on a coordinate (x,y), when a size and direction of the gradient at the respective pixel locations in the image are obtained, it may be identified how close the corresponding pixel is to the edge inside the image. In addition, the edge direction may be identified on the basis of the edge direction.

The size of the gradient size(or gradient size) may be a 'gradient', which is an absolute value. The gradient size may have a value which increases as a change of image brightness is dramatic. A dramatic brightness change occurs at an edge between the edge area and the edge surrounding area which are the two areas inside the image, and thus the absolute value of the gradient may indicate a large value at the edge of the two areas.

The processor 120 may identify an area in which the gradient size is larger than a predefined value as an edge center area (outline or center line), and maintain a pixel value of the edge center area as an original brightness of a pixel.

For example, the processor 120 may identify an area in which the gradient size is in the range of 150 and 200 as an edge center area. The edge center area may be an edge on which a contrast between pixels are dramatically changed. That is, an area in which the gradient size is in the range of 150 and 200 may be a darkest area. In this case, the processor 120 may maintain an original brightness of a pixel without compensating a pixel value of the edge center area. The gradient size of the edge center area is only to assist with an understanding of the disclosure, and may be modified to various size ranges.

The processor 120 may identify an area excluding the edge center area from among the edge area as an edge outskirt area. The processor 120 may adjust an amount of luminescence of a plurality of pixels included in the edge surrounding area and lighten a brightness of pixels of the edge outskirt area.

The processor 120 may increase an amount of luminescence of pixels of the edge surrounding area in order to lighten the brightness of the edge outskirt area.

The processor 120 may compensate a pixel value of the edge area by means of a function l'(x)=l(x)+f(g, d, L) on the basis of a pixel pitch, an amount of luminescence and gradient of the edge surrounding area. Here, the l(x) is an input pixel value of the edge area, the f(g, d, L) is a function for lightening a brightness of the edge area, the g is a gradient value, the d is a pixel pitch between a plurality of pixels included in the edge surrounding area, and the L is an amount of luminescence of pixels included in the edge surrounding area.

For example, the processor 120 may compensate the brightness of the edge area to be lightened by controlling a signal value of pixels included in the edge surrounding area to be increased as a pixel pitch of the edge surrounding area in the function f(g, d, L) increases (coarse pitch) or as the gradient size (g) increases. The degree of increase may be adjustable according to a basic luminescence amount (L) physically present in a pixel.

Figure 2:
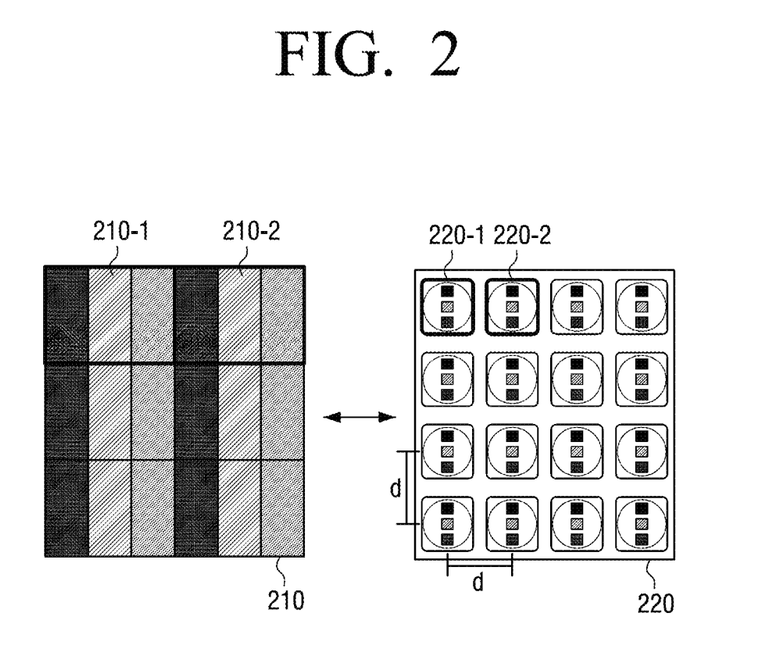
FIG. 2 is a diagram illustrating pixel structures of a liquid crystal display (LCD) display and a light-emitting diode (LED) display.

FIG. 2 is a diagram illustrating pixel structures of a liquid crystal display (LCD) display and a light-emitting diode (LED) display.

As illustrated in FIG. 2, in an LCD 210, an RGB subpixel is one pixel 210-1 and 210-2, which may have a structural characteristic in which a plurality of pixels 210-1 and 210-2 are adjacent to each other and attached without black sections. In contrast, in an LED 220, the RGB subpixel is one pixel package 220-1 and 220-2, which may have a structural characteristic in which a plurality of pixel packages are disposed as being spaced apart from each other with a black section space. In the LED 220, the pixel pitch is a distance d from a center point between two adjacent pixels to a center point. In the LCD 210, the pixel pitch is a distance between subpixels having the same color included in the pixel. For example, the pixel pitch in the LCD 210 is a distance between an R subpixel of the RGB pixel 210-1 and an R subpixel of the RGB pixel 210-2.

Accordingly, in the LED 220, due to a different pixel structure from the LCD 210, when the same input image signal is rendered to the LED 220 display, an image deterioration phenomenon occurs more than when rendering is performed to the LCD 210 display. According to the disclosure, a deterioration phenomenon when an image is rendered from the LED 220 display can be reduced through an image processing method in which a characteristic of a pixel structure of the LED 220 display is reflected.

Figure 3:
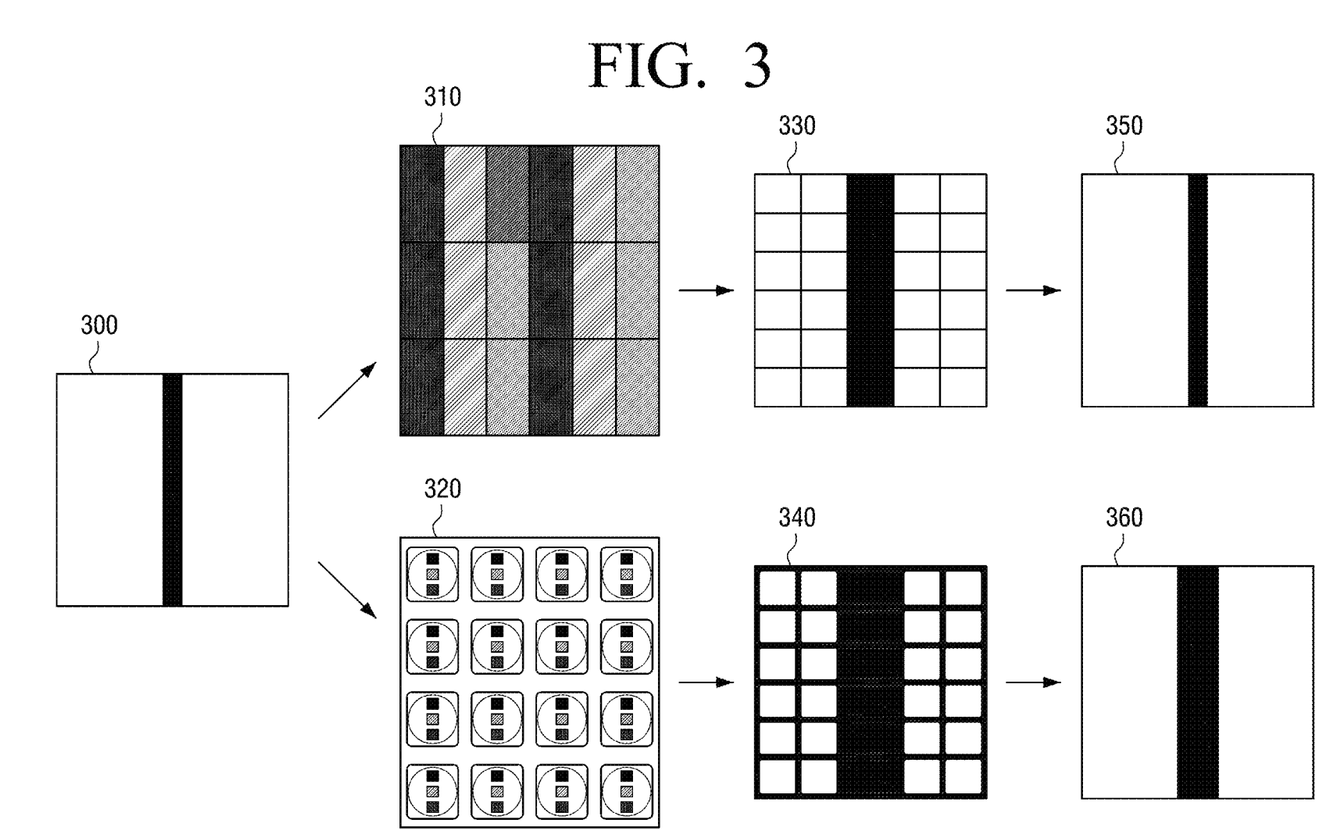
FIG. 3 is a diagram illustrating an edge area when an image processing is performed in a LCD display and a LED display according to the related art.

FIG. 3 is a diagram illustrating an edge area when an image processing is performed in a LCD display and a LED display according to the related art.

Referring to FIG. 3, for example, a thin line, which is a black section of an image, may be included in an input image signal. In a case that a related-art image processing method is used to render an input image signal from the display device 100 to an LCD 310 display, the LCD may acquire a fine pitch image 330 in which a distance between pixels of black section of the image is short. In contrast, in a case that a related-art image processing method is used to render an input image signal from the display device 100 to an LED 320 display, the LED may acquire a coarse pitch image 340 in which a distance between pixels of black section of the image is long. As described with reference to FIG. 2, in the LED display, a plurality of pixel packages may be disposed as being spaced apart from each other with a black section in between. In a case that an input image including a black section is processed, the LED display may generate a coarse pitch image having a larger pixel pitch than the LCD display. Accordingly, in a case that the same input image is processed and rendered to the LCD display and the LED display, an image quality deterioration phenomenon occurs more in an image 360 visible on the LED display rather than in an image 350 visible on the LCD display. Accordingly, the image 360 visible on the LED display may be a thicker line than the original image 300.

Figure 4:
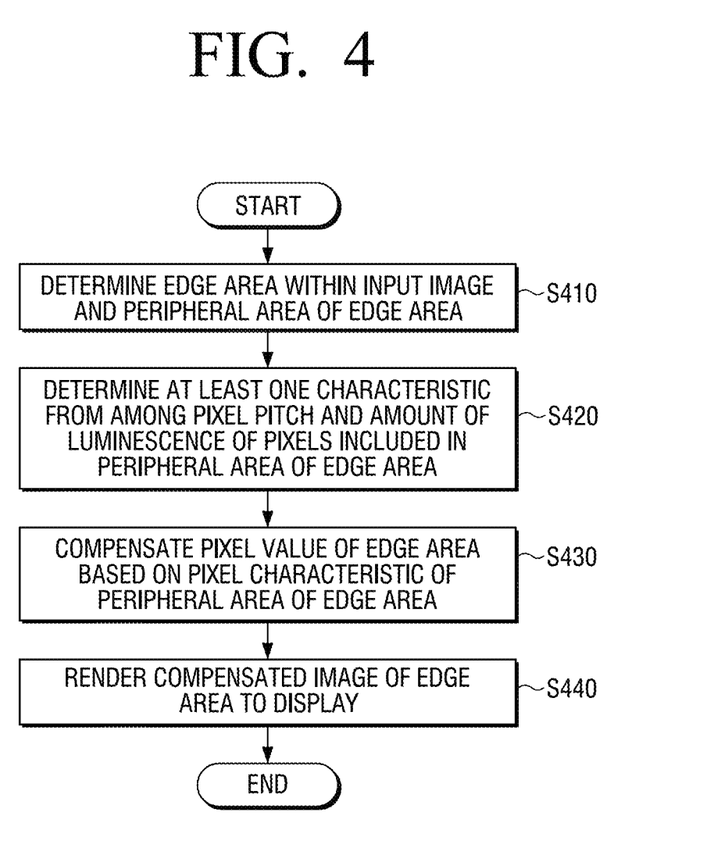
FIG. 4 is a flowchart illustrating an image processing method, according to an example embodiment.

FIG. 4 is a flowchart illustrating an image processing method, according to an example embodiment.

At operation S410, the display device 100 may identify an edge area and an edge surrounding area inside an input image in an input image signal. As described with reference to FIG. 1, the display device 100 may detect a gradient on the basis of a contrast among pixels of the input image, and identify an edge area and an edge surrounding area by means of a gradient size.

For example, an area in which the gradient size is large refers to an area in which a brightness between an area A and an area B changes dramatically. Accordingly, an edge between the area A and the area B may be identified using the gradient size. The display device 100 may identify a place with a darker contrast from among the area A and the area B as an edge area A, and identify a place with a brighter contrast as an edge surrounding area B.

In addition, the display device 100 may an area in which a gradient is greater than or equal to a predetermined size in the image as an edge center area A-1 which is an edge. In addition, an area excluding the edge center area A-1 from among the edge area A may be identified as the edge outskirt area A-2. The display device 100 may compensate a pixel value of the edge outskirt area A-2 on the basis of a pixel pitch and amount of luminescence included in the edge surrounding area B.

At operation S420, the display device 100 may identify at least one characteristic from among a pixel pitch and amount of luminescence of pixels included in the edge surrounding area. The pixel pitch between the pixels included in the edge surrounding area may refer to a distance between pixels of the edge surrounding area facing each other based on the edge area. For example, the pixel pitch may be a coarse pitch in which a distance between pixels is long, or may be a fine pitch in which a distance between pixels is short. In addition, the amount of luminescence may be a brightness on the LED display.

At operation S430, the display device 100 may compensate the pixel value of the edge area on the basis of a pixel characteristic of the edge surrounding area.

For example, the display device 100 may, when the pixel pitch of the edge surrounding area is a coarse pitch, increase the pixel luminescence amount of the edge surrounding area and lighten the brightness of the edge area as compared with a case where the pixel pitch of the edge surrounding area is a fine pitch.

In addition, the display device 100 may adjust an amount of luminescence of the edge surrounding area on the basis of a gradient inside an image signal. For example, a pixel brightness of image where a gradient is a negative value and a pixel brightness of image where the gradient is a positive value may be different from each other. Accordingly, the display device 100 may increase a pixel luminescence amount of the edge surrounding area in a section where the gradient is a negative value, and lighten a brightness of the edge area.

At operation S440, the display device 100 may render the compensated image in the edge area to the display on the basis of a pixel characteristic of the edge surrounding area. Accordingly, according to an example embodiment, the LED display may display an image for which image quality deterioration is improved as compared with a related-art display.

Figure 5:
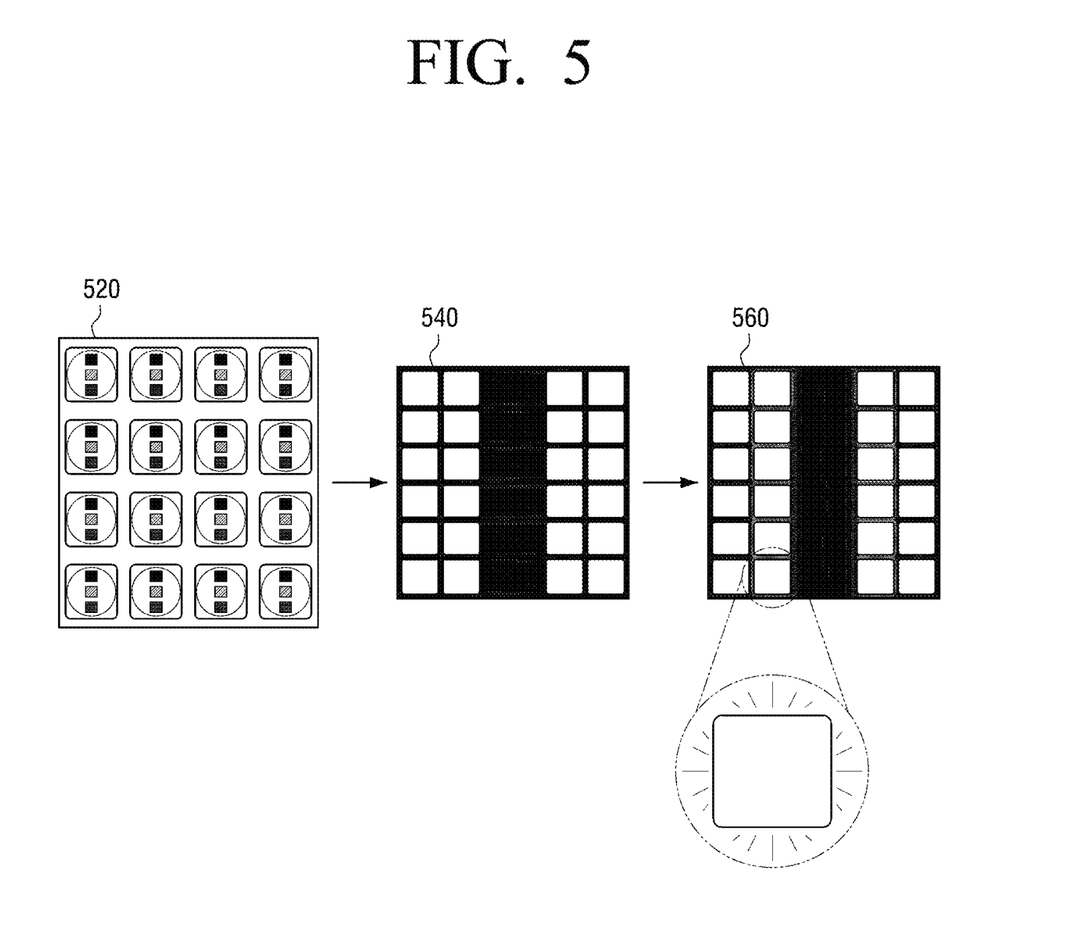
FIG. 5 is a diagram illustrating an image processing method in an LED display, according to an example embodiment.

FIG. 5 is a diagram illustrating an image processing method in an LED display, according to an example embodiment.

According to an example embodiment, in a case that an image signal input to the LED display 520 is analyzed using an edge detection algorithm, an image from which an edge is detected may be acquired. As described with reference to FIG. 4, in the acquired image, an edge detection image 540 may be divided into an edge area (black section in the center of the image) and an edge surrounding area. The display device 100 may generate a compensation image 560 by compensating a pixel value of the edge area by means of at least one of a gradient, a pixel pitch of the edge surrounding area, and an amount of luminescence. The adjustment of pixel luminescence amount of the edge surrounding area may refer to lightening a brightness of the respective pixels or darkening it. The increasing of luminescence amount may refer to lightening a brightness of the respective pixels.

FIG. 5 illustrates an example embodiment for edge detection in a vertical direction. However, the example is not limited thereto. According to an example embodiment, an edge direction may be detected through a direction of a gradient. Accordingly, the edge may be detected from various directions and positions inside the image. Accordingly, the display device 100 may detect an edge from all directions and positions inside the image, and compensate a pixel value (brightness) of the edge area by means of at least one of a pixel pitch and amount of luminescence of the edge surrounding area.

Figure 6A:
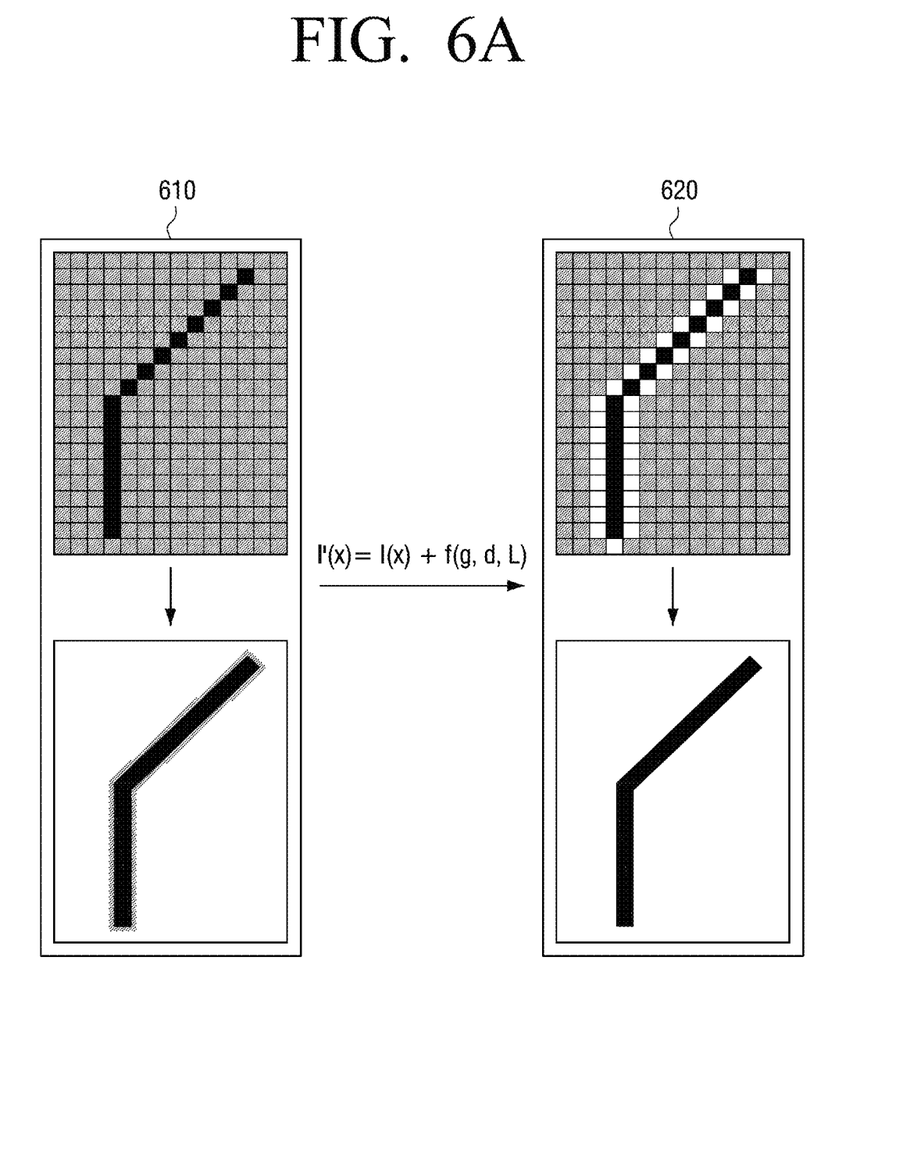
FIGS. 6A and 6B are diagrams illustrating an image generated by rendering an image to which an image processing method is applied to a display, according to various example embodiments.
Figure 6B:
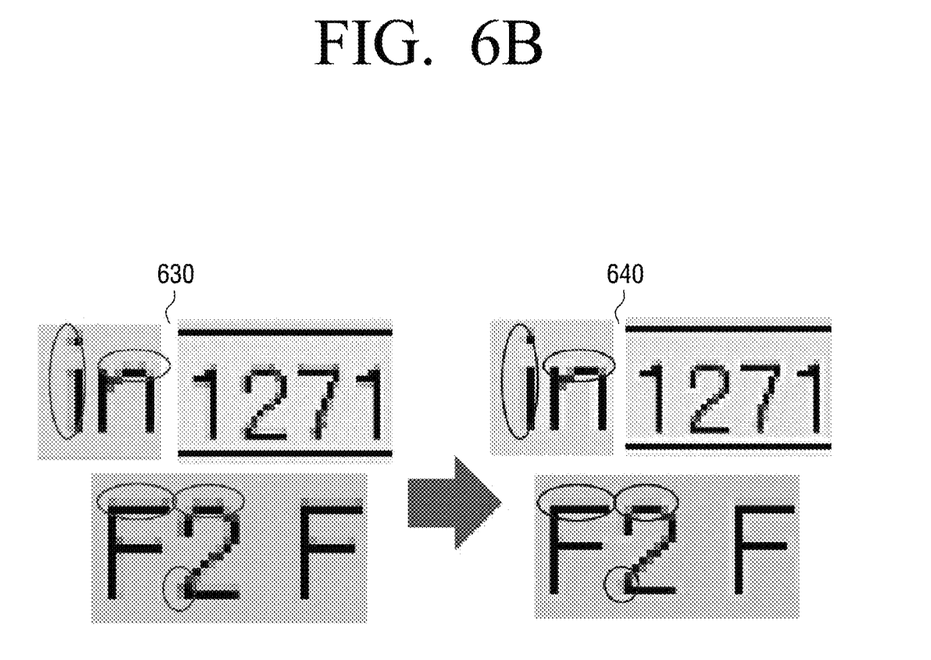

FIGS. 6A and 6B are diagrams illustrating an image generated by rendering an image to which an image processing method is applied to a display, according to various example embodiments.

Referring to FIG. 6A, in a case that an input image (thin line) is rendered to an LED display by means of a related-art image processing method, the thin line may be visible as being thicker than the thin line of the original image due to image deterioration.

According to an example embodiment, the display device 100 may detect an edge from the input image (thin line) 610 by means of an edge detection algorithm. As described with reference to FIG. 1, the display device 100 may acquire an image 620 for which improvement is made on the image quality deterioration by compensating, 620, a pixel value of the edge area by using a function $l'(x)=l(x)+f(g, d, L)$ on the basis of a pixel pitch of the edge surrounding area, an amount of luminescence and gradient of the edge surrounding area of the input image 610.

As illustrated in FIG. 6B, on the LED display, an image quality of an outline included in an image 640 to which an image processing method according to an example embodiment is applied is improved as compared with an image quality of an outline included in an image 630 to which a related-art image processing method is applied.

Figure 7:
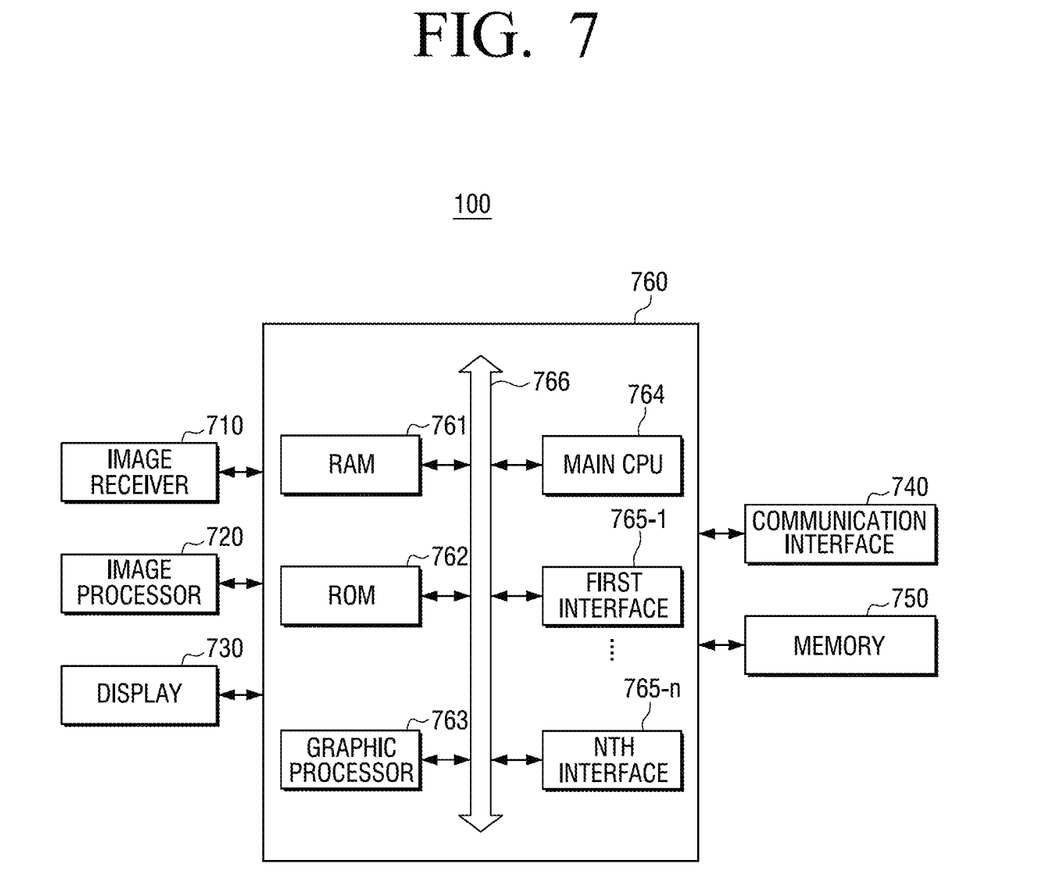
FIG. 7 is a block diagram illustrating a detailed configuration of a display device, according to an example embodiment.

FIG. 7 is a block diagram illustrating a detailed configuration of a display device, according to an example embodiment.

As illustrated in FIG. 7, the display device 100 may include at least one of an image receiver 710, an image processor 720, a display 730, a communication interface 740, a memory 750, and a processor 760. Meanwhile, the elements of the display device 100 illustrated in FIG. 7 is merely one of example embodiments, and may not be necessarily limited to the block diagram described above. Thus, the display device 100 illustrated in FIG. 7 may be partly omitted or modified, or added according to the type or purpose of the display device 100.

The image receiver 710 may receive input of an image signal through a variety of sources, and obtain an image data. For example, the image receiver 710 may receive an image data from an external server, and receive an image data from a device located outside of the display device 100.

Further, the image receiver 710 may acquire image data by photographing the external environment. For example, the image receiver 710 may be implemented to be camera which photographs the external environment of the display device 100.

The image processor 720 is unit to process the image data received by the image receiver 710. The image processor 720 may perform various image processing with respect to image data such as decoding, scaling, noise filtering, frame rate conversion, resolution conversion, and the like.

The display 730 may display video frames in which the image data is processed in the image processor 720 or at least one of various screens generated in a graphic processor 793 on a display area.

The display 730 may have various sizes. The display 730 may be configured with a plurality of pixels. In this case, the resolution may be represented by the number of pixels in the horizontal direction multiplied by the number of pixels in the vertical direction. For example, the display 730 may have 320×320 resolution, 360×480 resolution, 720×1280 resolution, 1280×800 resolution, 3940×2160 resolution, and so on.

The display 730 may be implemented in a form of a flexible display form and may be connected to at least one of a front area, a side area, and a rear area of the display device 100.

The communication interface 740 is configured to communicate with various kinds of external devices in various communication methods. The communication interface 740 may include at least one among a Wi-Fi chip, a Bluetooth chip, a wireless communication chip, and a near-field communication (NFC) chip. The processor 790 may perform communication with an external server or various types of external devices by using the communication interface 740.

The memory 750 may store various programs and data necessary for the operation of the display device 100. The memory 750 may be implemented as a non-volatile memory, a volatile memory, a flash memory, a hard disk drive (HDD) or a solid state drive (SDD). The memory 750 is accessed by the processor 790 and the reading/recording/modification/deletion/update of data by the processor 790 can be performed. According to an example embodiment of the present disclosure, the term of the memory may include the memory 750, read-only memory (ROM) 792 and random access memory (RAM) 791 within the processor 790, and a memory card (not illustrated) attached to the display device 100 (e.g., micro secure digital (SD) card or memory stick).

Also, the memory 750 may store a program, data, and the like for constituting various types of screens that will be displayed in the display area of the display 730.

The processor 790 may control an overall operation of the display device 100 by using various types of programs stored in the memory 750.

The processor 790 may include the RAM 791, the ROM 792, a graphic processor 793, a main central processing unit (CPU) 794, first through nth interfaces 795-1 through 795-n, and a bus 796. The RAM 791, the ROM 792, the graphic processor 793, the main CPU 794, and the first to the nth interface 795-1-795-n may be interconnected through the bus 796.

The RAM 791 stores an operating system (O/S) and an application program. In detail, if the display device 100 is booted, the 0/S may be stored in the RAM 791, and various types of application data selected by the user may be stored in the RAM 791.

The ROM 792 may store a set of instructions for system booting. When a turn-on command is input and thus the electric power is supplied, the main CPU 794 may copy the stored O/S in the memory 750 to RAM 191 according to the commands stored in ROM 792, and boot the system by executing O/S. In response to the booting being completed, the main CPU 794 may copy various application programs stored in the memory 750 to the RAM 791, and execute the application programs copied to the RAM 791 to perform various operations.

The graphic processor 193 generates a screen including various types of objects such as an item, an image, a text, and the like by using a renderer (not illustrated). The screen generated at the renderer may be displayed within the display area of the display 730.

The main CPU 794 accesses the memory 750 to perform booting using the OS stored in the memory 750. The main CPU 794 performs operations using a variety of programs, content, data, and the like, stored in the memory 750.

The first to the nth interface (795-1 to 795-n) are connected to the above-described various elements. One of the first to the n interface 795-1 to 795-n may be network interface connected with an external device through network.

A device (e.g., modules or the display device 100) or method (e.g., operations) according to various embodiments may be executed, for example, by at least one computer (e.g., processor 790) executing instructions included in at least one program of programs maintained in computer-readable storage media.

When an instruction is executed by a computer (e.g., processor 790), the at least one computer may perform a function corresponding to the instruction. The computer readable recording medium may be, for example, the memory 750.

A program may be included in computer-readable storage media, such as hard disk, floppy disk, magnetic media (e.g., a magnetic tape), optical media (e.g., compact disc read only memory (CD-ROM), digital versatile disc (DVD), magneto-optical media (e.g., floptical disk), hardware device (e.g., a read only memory (ROM), a random access memory (RAM), a flash memory, or the like), or the like. In this case, a storage medium is generally included as a part of elements of the display device 100 but may be installed through a port of the display device 100 or may be included in an external device (e.g., cloud, a server, or another electronic device) positioned outside the display device 100. Also, the program may be divided and stored on a plurality of storage media. Here, at least some of the plurality of storage media may be positioned in an external device of the display device 100.

An instruction may include a machine language code that is made by a compiler and a high-level language code that may be executed by a computer by using an interpreter or the like. The hardware device described above may be constituted to operate as one or more software modules in order to perform operations of various exemplary embodiments, but an opposite case is similar.

The foregoing exemplary embodiments and advantages are merely exemplary and are not to be construed as limiting the present disclosure. The present teaching may be readily applied to other types of apparatuses. Also, the description of the exemplary embodiments of the present disclosure is intended to be illustrative, and not to limit the scope of the claims, and many alternatives, modifications, and variations will be apparent to those skilled in the art.

The invention claimed is:

1. A display device, comprising:
a display; and
a processor configured to:
identify an edge area included in an image and a peripheral area of the edge area,
compensate a pixel value corresponding to the edge area based on a pixel pitch between a first plurality of pixels corresponding to the peripheral area, and control the display to display the image in which the pixel value of the edge area is compensated.

2. The display device as claimed in claim 1, wherein the processor is configured to detect a gradient based on a contrast among a second plurality of pixels included in the image, and identify the edge area based on a size of the gradient, and wherein the processor is configured to compensate the pixel value corresponding to the edge area based on an amount of luminescence of the first plurality of pixels.

3. The display device as claimed in claim 2, wherein the processor is configured to identify an area including the gradient of which the size of the gradient is greater than a predefined value as an edge center area, and maintain a second pixel value of the identified edge center area at an original brightness of a pixel.

4. The display device as claimed in claim 3, wherein the processor is configured to identify an area excluding the edge center area from among the edge area as an edge outskirt area, and control a brightness of pixels of the edge outskirt area by adjusting the amount of luminescence of the first plurality of pixels included in the peripheral area.

5. The display device as claimed in claim 2, wherein the processor is configured to compensate the pixel value of the edge area by using a function I'(x)=I(x)+f(g, d, L) on the basis of the pixel pitch, the amount of luminescence, and the gradient, and wherein the I'(x) represents an input pixel value of the edge area, the f(g, d, L) represents a function for lightening a brightness of the edge area, the g represents a value of the gradient, the d represents the pixel pitch among the first plurality of pixels included in the peripheral area, and the L represents the amount of luminescence of the first plurality of pixels included in the peripheral area.

6. The display device as claimed in claim 1, wherein the pixel pitch is a distance between pixels of the edge peripheral area facing based on the edge area.

7. The display device as claimed in claim 1, wherein the display comprises a light-emitting diode (LED).

8. An image processing method, comprising:

identifying an edge area included in an image and a peripheral area of the edge area;

compensating a pixel value corresponding to the edge area based on a pixel pitch between a first plurality of pixels corresponding to the peripheral area; and displaying the image in which the pixel value of the edge area is compensated.

9. The image processing method as claimed in claim 8, wherein the identifying the edge area within the image and the peripheral area of the edge area further comprises detecting a gradient based on a contrast among a second plurality of pixels included in the image, and wherein the compensating further comprises the pixel value corresponding to the edge area based on an amount of luminescence of the first plurality of pixels.

10. The image processing method as claimed in claim 9, wherein the compensating further comprises:

identifying an area including the gradient of which the size of the gradient is greater than a predefined value as an edge center area; and maintaining a second pixel value of the identified edge center area at an original brightness of a pixel.

11. The image processing method as claimed in claim 10, wherein the compensating further comprises:

identifying an area excluding the edge center area from among the edge area as an edge outskirt area; and controlling a brightness of pixels of the edge outskirt area by adjusting the amount of luminescence of the first plurality of pixels included in the peripheral area.

12. The image processing method as claimed in claim 9, wherein the compensating further comprises compensating a pixel value of the edge area by using a function I'(x)=I(x)+f(g, d, L) on the basis of the pixel pitch, the amount of luminescence, and the gradient, and wherein the I'(x) represents an input pixel value of the edge area, the f(g, d, L) represents a function for lightening a brightness of the edge area, the g represents a value of the gradient, the d represents the pixel pitch among the first plurality of pixels included in the peripheral area, and the L represents the amount of luminescence of the first plurality of pixels included in the peripheral area.

13. The image processing method as claimed in claim 8, wherein the pixel pitch is a distance between pixels of the edge peripheral area facing based on the edge area.

14. The image processing method as claimed in claim 8, wherein the display comprises a light-emitting diode (LED).

* * * * *